(12) United States Patent
Momoi et al.

(10) Patent No.: US 12,393,079 B2
(45) Date of Patent: Aug. 19, 2025

(54) LIGHT EMITTING DEVICE, LIGHT FLUX CONTROLLING MEMBER AND SURFACE LIGHT SOURCE DEVICE

(71) Applicant: Enplas Corporation, Kawaguchi (JP)

(72) Inventors: Takuro Momoi, Kawaguchi (JP); Yuki Fujii, Kawaguchi (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 18/817,623

(22) Filed: Aug. 28, 2024

(65) Prior Publication Data
US 2025/0076708 A1    Mar. 6, 2025

(30) Foreign Application Priority Data

Sep. 4, 2023  (JP) ................................ 2023-142878

(51) Int. Cl.
*G02F 1/1335* (2006.01)
*G02F 1/13357* (2006.01)

(52) U.S. Cl.
CPC .. *G02F 1/133607* (2021.01); *G02F 1/133603* (2013.01); *G02F 1/133605* (2013.01)

(58) Field of Classification Search
CPC ......... G02F 1/133607; G02F 1/133605; G02F 1/133603; G02F 1/133606; F21V 7/0091; F21V 5/007; F21V 5/04; F21K 9/68; F21Y 2105/10; F21Y 2105/12; F21Y 2105/14; F21Y 2105/16; G02B 3/0056
See application file for complete search history.

(56) References Cited

U.S. PATENT DOCUMENTS

| | | | |
|---|---|---|---|
| 2009/0219716 A1* | 9/2009 | Weaver | F21V 5/04 362/235 |
| 2015/0131265 A1* | 5/2015 | Nakamura | G02B 19/0061 362/346 |
| 2016/0187726 A1* | 6/2016 | Han | G02B 19/0061 362/335 |
| 2017/0131458 A1* | 5/2017 | Yamada | G02B 6/0068 |
| 2019/0227214 A1* | 7/2019 | Chen | G02B 6/0021 |

FOREIGN PATENT DOCUMENTS

| | | | |
|---|---|---|---|
| JP | 2022082802 A | | 6/2022 |
| KR | 101957184 B1 | * | 3/2019 |

* cited by examiner

*Primary Examiner* — Erin Kryukova
(74) *Attorney, Agent, or Firm* — The Roy Gross Law Firm, LLC; Roy D. Gross

(57) ABSTRACT

A light emitting device of the present invention includes: a substrate; a light emitting element; a light flux controlling member including a recess, a first reflecting surface, and an emission surface, the recess being configured to transmit light emitted from the light emitting element, the first reflecting surface being configured to reflect a part of light transmitted through the recess in a direction that is substantially perpendicular to a central axis of the light emitting element and is away from the central axis, the emission surface being configured to emit to outside another part of the light emitted from the light emitting element and light reflected at the first reflecting surface; and a light transmissive resin provided in the recess to seal the light emitting element and bond the light flux controlling member to the substrate and the light emitting element.

9 Claims, 18 Drawing Sheets

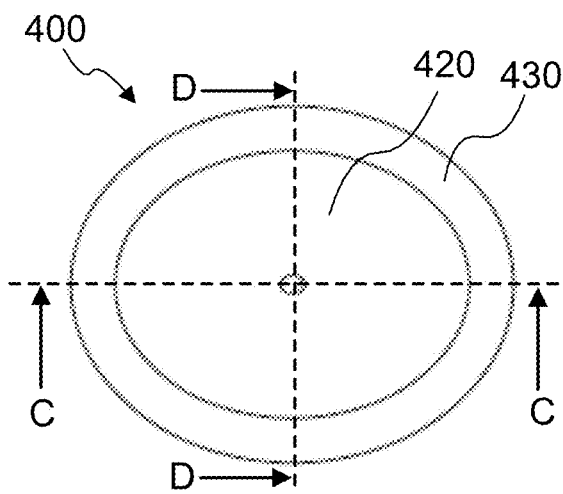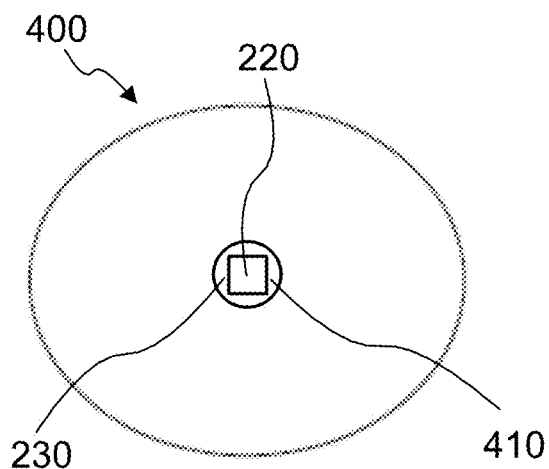
FIG. 16A  FIG. 16B
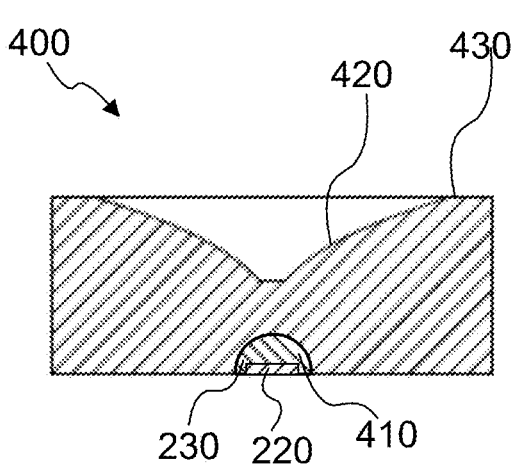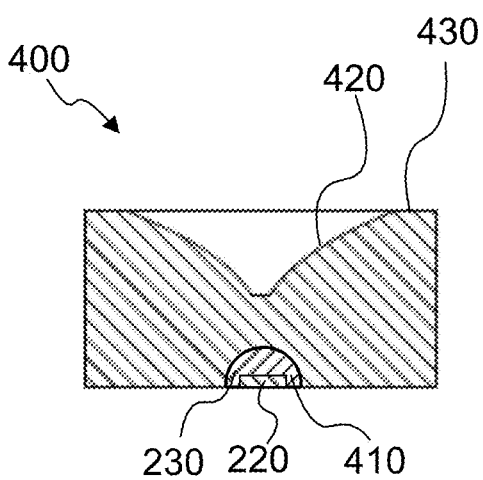
FIG. 16C  FIG. 16D
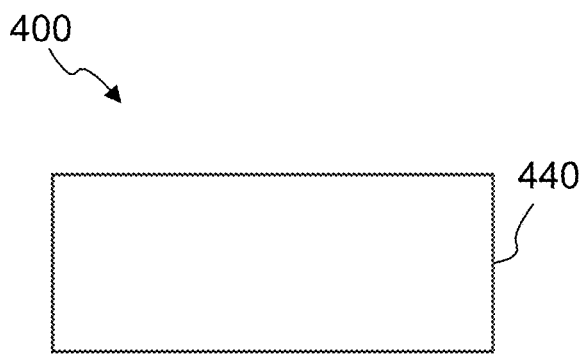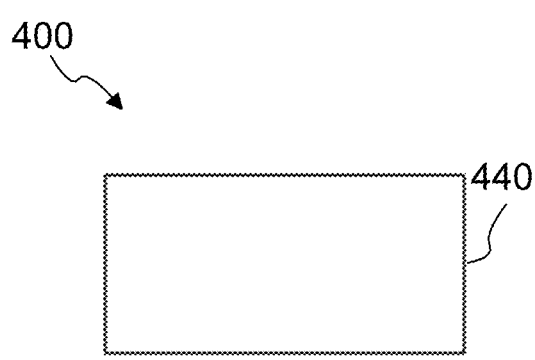
FIG. 16E  FIG. 16F

LIGHT EMITTING DEVICE, LIGHT FLUX CONTROLLING MEMBER AND SURFACE LIGHT SOURCE DEVICE

CROSS REFERENCE TO RELATED APPLICATIONS

This application is entitled to and claims the benefit of Japanese Patent Application No. 2023-142878, filed on Sep. 4, 2023, the disclosure of which including the specification, drawings and abstract is incorporated herein by reference in its entirety.

TECHNICAL FIELD

The present invention relates to a light emitting device, a light flux controlling member and a surface light source device.

BACKGROUND ART

A technique called potting is known to seal components and circuits by injecting and curing resin into the components and circuits placed on a substrate. In addition, light-emitting devices with a light-reflecting film on the top surface are known. In recent years, as a light emitting device used in high-end direct-type surface light source devices, a light emitting device having a light reflection film on its upper surface, which is placed on a substrate, is sealed with resin. For example, PTL 1 discloses such a light emitting device.

CITATION LIST

Patent Literature

PTL 1
Japanese Patent Application Laid-Open No. 2022-082802

SUMMARY OF INVENTION

Technical Problem

In the above-described light emitting devices, the resin that covers and seals the light emitting element functions to spread the light. As such the light from the light emitting element sealed with the resin is more spread in comparison with the case where only the light emitting element is provided. When the light is more spread, advantageously the center-to-center distance (pitch) of a plurality of light emitting devices can be increased in the surface light source device, and the cost can be reduced by reducing the number of light emitting devices.

However, the potting seals the light emitting element by dropping the resin to the light emitting element disposed on the substrate, and as such the desired shape of the resin cannot be achieved. As a result the light spreading effect may become insufficient.

An object of the present invention is to provide a light emitting device that can further spread light while sealing the light emitting element. In addition, another object of the present invention is to provide a surface light source device including the light emitting device. In addition, another object of the present invention is to provide a light flux controlling member used for the light emitting device.

Solution to Problem

The present invention relates to the following light emitting device, light flux controlling member and surface light source device.

[1] A light emitting device including: a substrate; a light emitting element disposed on the substrate and including a light reflection film at a top surface; a light flux controlling member including a recess, a first reflecting surface, and an emission surface, the recess being disposed on a rear side to cover the light emitting element and configured to transmit light emitted from the light emitting element, the first reflecting surface being disposed on a front side and configured to reflect a part of light transmitted through the recess in a direction that is substantially perpendicular to a central axis of the light emitting element and is away from the central axis, the emission surface being configured to emit to an outside another part of the light emitted from the light emitting element and light reflected at the first reflecting surface; and a light transmissive resin provided in the recess to seal the light emitting element and bond the light flux controlling member to the substrate and the light emitting element. In a see-through plan view, an end of the first reflecting surface on the central axis side is located inside an outer edge of the light emitting element, and a distance between the end of the first reflecting surface and the outer edge is 25% or less of a length of a minor axis of the light emitting element passing through a center of the light emitting element.

[2] The light emitting device according to [1], in which the distance between the end of the first reflecting surface and the outer edge is 23% or less of the length of the minor axis of the light emitting element passing through the center of the light emitting element.

[3] The light emitting device according to [1] or [2], in which an area-on inside of an inner edge formed by the end of the first reflecting surface is 60% to 80% of an area inside of an outer edge of the light emitting element.

[4] The light emitting device according to any one of [1] to [3], in which the light flux controlling member further includes a second reflecting surface disposed-on outside of the first reflecting surface on the front side, the second reflecting surface being a flat surface that is substantially perpendicular to the central axis.

[5] The light emitting device according to [4], in which when a direction of a light beam emitted from an emission point set to a position of half a height of the light emitting element in a direction that is perpendicular to the substrate and is toward the front side of the light flux controlling member is set to 0°, a first angle light beam emitted at an angle of 70° to 110° includes a light beam that is emitted from the light emitting element and then emitted from the emission surface without being reflected at the first reflecting surface and the second reflecting surface.

[6] The light emitting device according to [4] or [5], in which when a direction of a light beam emitted from an emission point set to a position of half a height of the light emitting element in a direction that is perpendicular to the substrate and is toward the front side of the light flux controlling member is set to 0°, a second angle light beam emitted at an angle of equal to or greater than 60° and smaller than 70°, and a third angle light beam emitted at an angle greater than 110° and equal to or smaller than 120° includes a light beam that is emitted from the light emitting element and then emitted toward the substrate from the emission surface by being reflected at the second reflecting surface.

[7] The light emitting device according to any one of [1] to [6], in which the light flux controlling member and the light transmissive resin each have a refractive index of 1.4 to 1.6.

[8] A light flux controlling member configured to be used in the light emitting device according to any one of [1] to [7].

[9] A surface light source device including: a light diffusion plate; and at least one light emitting device according to any one of [1] to [7].

[10] The surface light source device according to [9], in which the at least one light emitting device is a plurality of light emitting devices, the plurality of light emitting devices is disposed in a plurality of lines at even first intervals in an X direction and aligned in a plurality of lines at even second intervals in a Y direction perpendicular to the X direction, and H/Px is 0.2 to 0.3 where the Px is a center-to-center distance of two light emitting devices adjacent to each other in the X direction among the plurality of light emitting devices, the Py is a center-to-center distance of two light emitting devices adjacent to each other in the Y direction among the plurality of light emitting devices, the Px is equal to or smaller than the Py, and the H is a distance between the substrate and the light diffusion plate.

Advantageous Effects of Invention

According to the present invention, it is possible to provide a light emitting device that can further spread light while sealing the light emitting element. In addition, according to the present invention, it is possible to provide a surface light source device including the light emitting device. In addition, according to the present invention, it is possible to provide a light flux controlling member used for the light emitting device.

BRIEF DESCRIPTION OF DRAWINGS

FIGS. 16A to 16F are diagrams illustrating a configuration of the light flux controlling member according to Embodiment 2;

DESCRIPTION OF EMBODIMENTS

An embodiment of the present invention is elaborated below with reference to the accompanying drawings. In the following description, as a typical example of the surface light source device according to the present invention, a surface light source device suitable for a backlight of a liquid crystal display apparatus and the like is described. In combination with display member 102 (e.g., a liquid crystal panel) to which light from the surface light source device is applied, the surface light source device can be used as display device 100' (see FIG. 1B).

EMBODIMENTS

Configurations of Surface Light Source Device and Light emitting Device

Figure 1A:
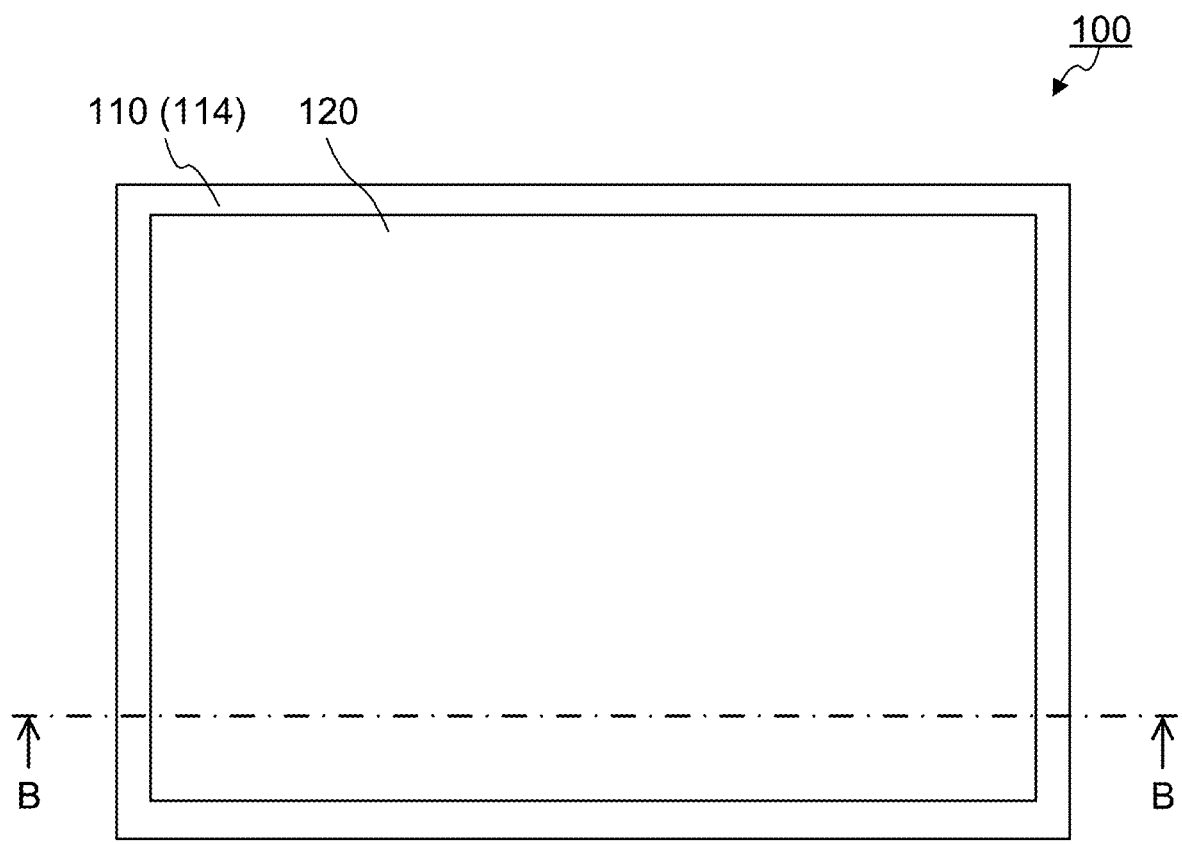
FIGS. 1A and 1B are diagrams illustrating a configuration of a surface light source device according to Embodiment 1.
Figure 1B:
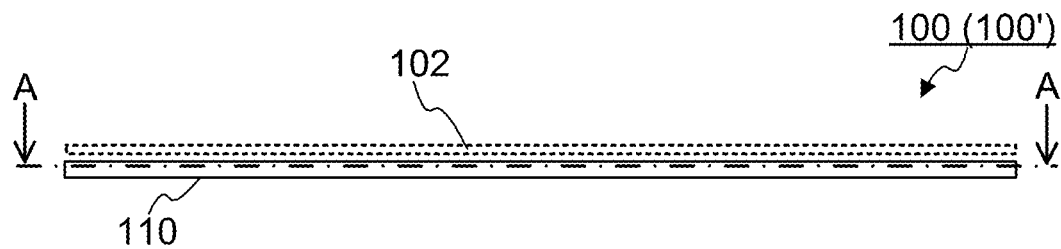
Figure 2A:
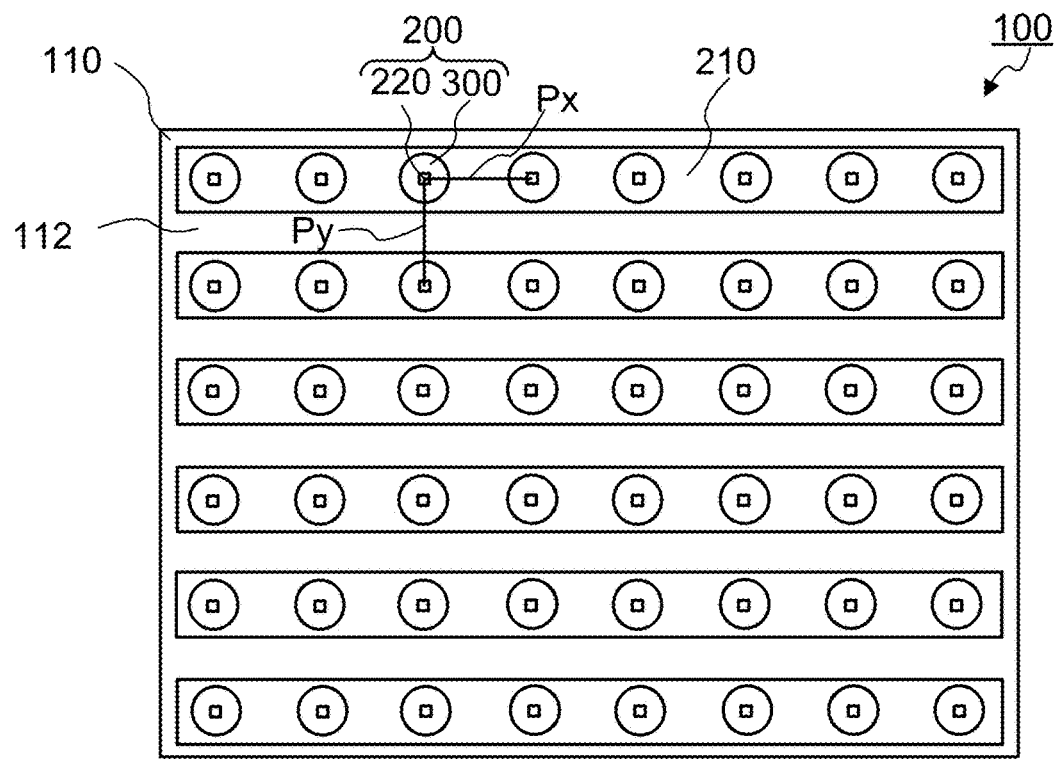
FIGS. 2A and 2B are diagrams illustrating an arrangement of a light emitting device of the surface light source device.
Figure 2B:
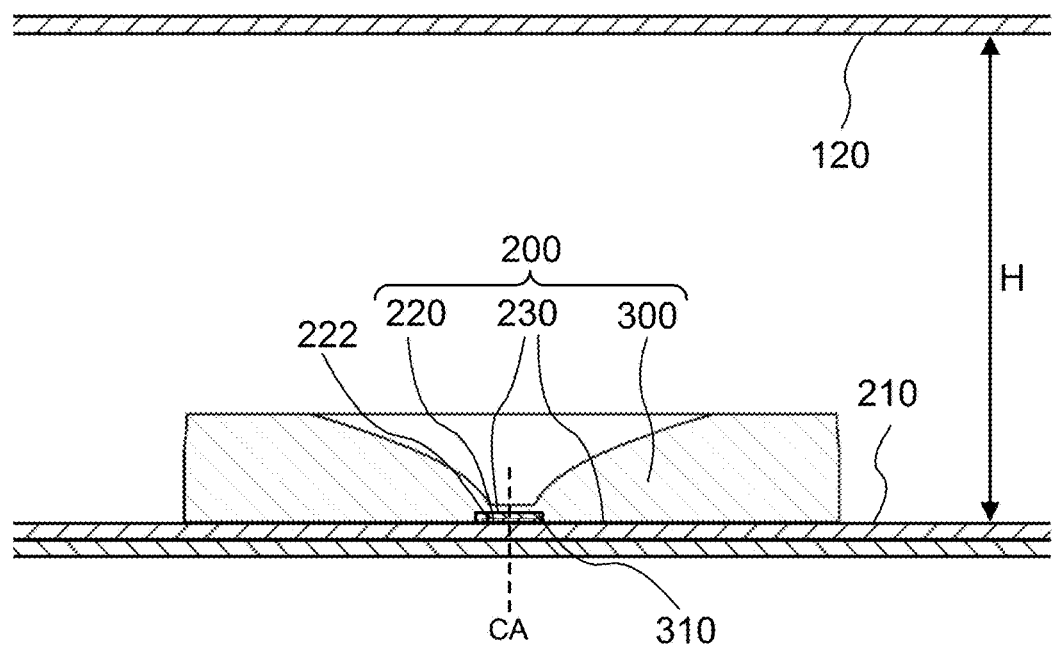

FIGS. 1A, 1B and 2A are diagrams illustrating a configuration of surface light source device 100 according to the embodiment of the present invention. FIG. 1A is a plan view of surface light source device 100, and FIG. 1B is a front view. FIG. 2A is a schematic cross-sectional view taken along line A-A of FIG. 1B, and FIG. 2B is a partially enlarged cross-sectional view taken along line B-B of FIG. 1A. FIG. 2A schematically illustrates an arrangement of a plurality of light emitting devices 200 in surface light source device 100, and FIG. 2B illustrates in cross-sectional view an arrangement of light emitting devices 200. As illustrated in FIG. 1A to 2B, surface light source device 100 according to the present embodiment includes housing 110, the plurality of light emitting devices 200 and light diffusion plate 120. As illustrated in FIG. 2A, the plurality of light emitting devices 200 is disposed on bottom plate 112 of housing 110. The inner surface of bottom plate 112 functions as a diffusive reflection surface. In addition, top plate 114 of housing 110 is provided with an opening. Light diffusion plate 120 is disposed to close the opening, and functions as a light emitting surface. The size of the light emitting surface is not limited, but is approximately 400 mm×approximately 700 mm, for example.

As illustrated in FIG. 2A, in the present embodiment, light emitting device 200 is fixed to substrate 210 fixed at a predetermined position on bottom plate 112 of housing 110. In the present embodiment, substrate 210 has a bar shape. Light emitting device 200 includes light flux controlling member 300 (lens) for controlling the distribution of light from light emitting element 220. Note that light emitting element 220 is disposed below light flux controlling member 300 and is therefore normally invisible, but light emitting element 220 is illustrated in FIG. 2A for the purpose of description.

As illustrated in FIG. 2A, in the present embodiment, the plurality of light emitting devices 200 is disposed side by side in a line at even intervals in the X direction, and disposed side by side in a line at even intervals in the Y direction perpendicular to the X direction. As illustrated in FIG. 2A, the X direction and the Y direction are defined such that Px is equal to or smaller than Py where Px is the center-to-center distance of two light emitting devices 200 adjacent to each other in the X direction, and Py is the center-to-center distance of two light emitting devices 200 adjacent to each other in the Y direction. In the present embodiment, Px and Py are equal to each other as illustrated in FIG. 2A. Note that the center-to-center distance of two light emitting devices 200 as used herein means the center-to-center distance of two light emitting elements 220 of two light emitting devices 200.

FIG. 2B is a sectional view of light emitting device 200 illustrated in FIG. 2A. As illustrated in FIG. 2B, in light emitting device 200, recess 310 of light flux controlling member 300 (lens) is disposed on light emitting element 220. In addition, light transmissive resin 230 for bonding light flux controlling member 300 to the substrate while sealing light emitting element 220 is provided between light emitting element 220 and recess 310 (inside recess 310). Light emitting device 200 in surface light source device 100 according to the embodiment of the present invention can spread the light from light emitting element 220 with light flux controlling member 300. Therefore, the distance (pitch) between the plurality of light emitting devices 200 can be increased, and the cost can be reduced by reducing the number of light emitting devices 200. Such a configuration of light flux controlling member 300 will be specifically described later.

In addition, in the surface light source device of the present embodiment, the relationship between the distance between substrate 210 and light diffusion plate 120 and the pitch of light emitting device 200 may be set as follows. Specifically, H/Px may be 0.2 to 0.3 where Px is the center-to-center distance of light emitting elements 220 of two light emitting devices 200 adjacent to each other in the X direction, Py is the center-to-center distance of light emitting elements 220 of two light emitting devices 200 adjacent to each other in the Y direction (as described above, the X direction and the Y direction are defined such that Px is equal to or smaller than Py), and H is the distance between substrate 210 and light diffusion plate 120.

Light Emitting Element

Light emitting element 220 is a light source of surface light source device 100, and mounted on substrate 210. Light emitting element 220 is a light emitting diode (LED) such as a white light emitting diode, for example. In addition, light emitting element 220 is a light emitting element provided with a light reflection film 222 on its surface. As such almost no light is emitted from the top surface of light emitting element 220, and the light is mainly emitted from the side surface. The light reflection film 222 is a DBR (Distributed Bragg Reflector) film, for example. The size of light emitting element 220 is not limited, but preferably it has a rectangular shape in plan view with each side having a length of 0.1 mm to 1.0 mm, more preferably 0.2 mm to 0.7 mm. In the present embodiment, light emitting element 220 has a rectangular (square) shape in plan view.

Light Transmissive Resin

As illustrated in FIG. 2B, light transmissive resin 230 is provided between light emitting element 220 and recess 310 on the rear side of light flux controlling member 300 (inside recess 310), to bond light flux controlling member 300 to substrate 210 while sealing light emitting element 220. Light transmissive resin 230 is not limited as long as this functions is provided. From the viewpoint of suppressing the refraction of light emitted from light emitting element 220, light transmissive resin 230 preferably has a refractive index close to that of the material of light flux controlling member 300. More specifically, the absolute value of the difference between the refractive index of light flux controlling member 300 and the refractive index of light transmissive resin 230 is preferably 0.1 or smaller. It suffices that the refractive index of light transmissive resin 230 is 1.4 to 1.6, for example. Examples of such a light transmissive resin 230 include epoxy resin, silicone resin, and mixtures of these resins.

Light Flux Controlling Member

Figure 3A:
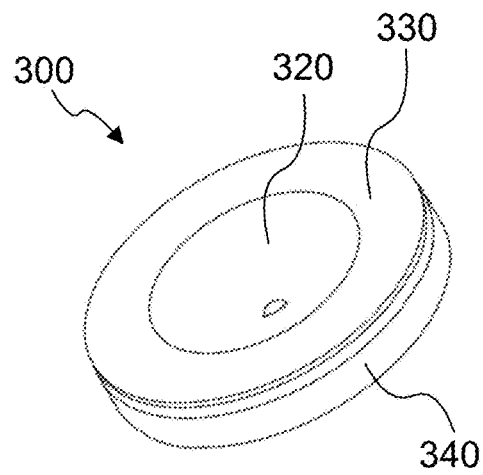
FIGS. 3A to 3E are diagrams illustrating a configuration of a light flux controlling member according to the embodiment.
Figure 3B:
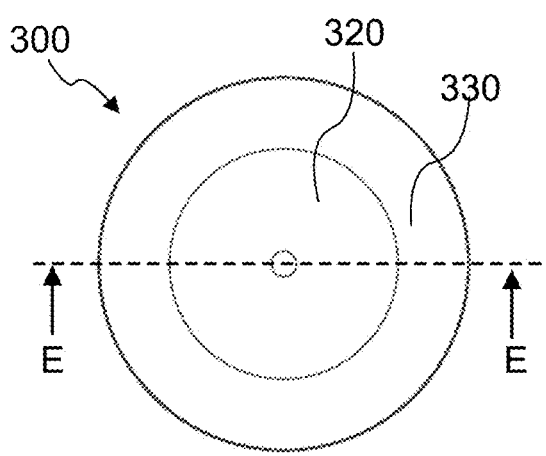
Figure 3C:
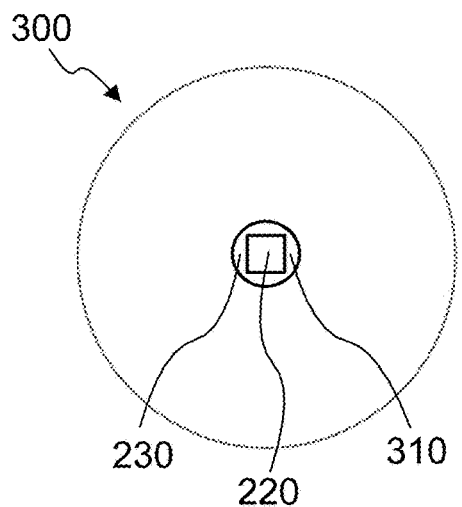
Figure 3D:
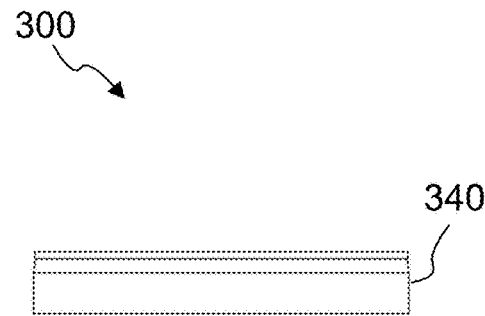
Figure 3E:
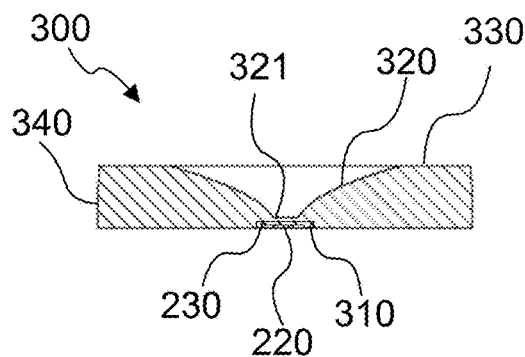

FIG. 3A is a perspective view of light flux controlling member 300, FIG. 3B is a plan view, FIG. 3C is a bottom view, FIG. 3D is a side view, and FIG. 3E is a sectional view taken along line E-E of FIG. 3B. Note that FIGS. 3C and 3E illustrate a state where light emitting element 220 is sealed with light transmissive resin 230 in recess 310 of light flux controlling member 300.

Light flux controlling member 300 is an optical member that controls the distribution of light emitted from light emitting element 220, and is bonded to substrate 210 with light transmissive resin 230 provided in recess 310 on the rear side of light flux controlling member 300. The external shape of light flux controlling member 300 is a substantially disk-shape, and is a circular shape in plan view and bottom view. It suffices that the refractive index of light flux controlling member 300 is 1.4 to 1.6, for example. Light flux controlling member 300 includes recess 310, first reflecting surface 320, second reflecting surface 330, and emission surface 340. Each member is described below.

Recess

Recess 310 is disposed to intersect central axis CA of light emitting element 220 (see FIG. 2B) on the rear side of light flux controlling member 300. The inner surface of recess 310 is a surface through which light from light emitting element 220 is transmitted into light flux controlling member 300. Recess 310 is filled with light transmissive resin 230 to seal light emitting element 220. In the present embodiment, the shape of recess 310 is a disk shape, and is a circular shape in bottom view of light flux controlling member 300.

It suffices that recess 310 formed in light flux controlling member 300 is recess capable of accommodating light emitting element 220, and that light flux controlling member 300 and light emitting element 220 are bonded through light transmissive resin 230 in recess 310, and the shape of recess 310 is not limited to the shape in the illustration.

First Reflecting Surface

First reflecting surface 320, disposed on the front side of light flux controlling member 300, reflects at least a part of the light entered from recess 310 in the direction that is substantially perpendicular to central axis CA of light emitting element 220, and is away from central axis CA. As illustrated in FIG. 3B, first reflecting surface 320 is disposed in a ring shape surrounding the center of light flux controlling member 300 in plan view of light flux controlling member 300. In addition, as is clear from the sectional view of FIG. 3E, first reflecting surface 320 is a curved surface, and the tangent to the curved surface gradually comes closer to the rear surface of light flux controlling member 300 parallel from the center of light flux controlling member 300 toward the outside. With first reflecting surface 320 having such a shape, the light having transmitted through the recess and reached first reflecting surface 320 is reflected in the direction away from the central axis of light emitting element 220, and emitted mainly from emission surface 340.

Figure 4A:
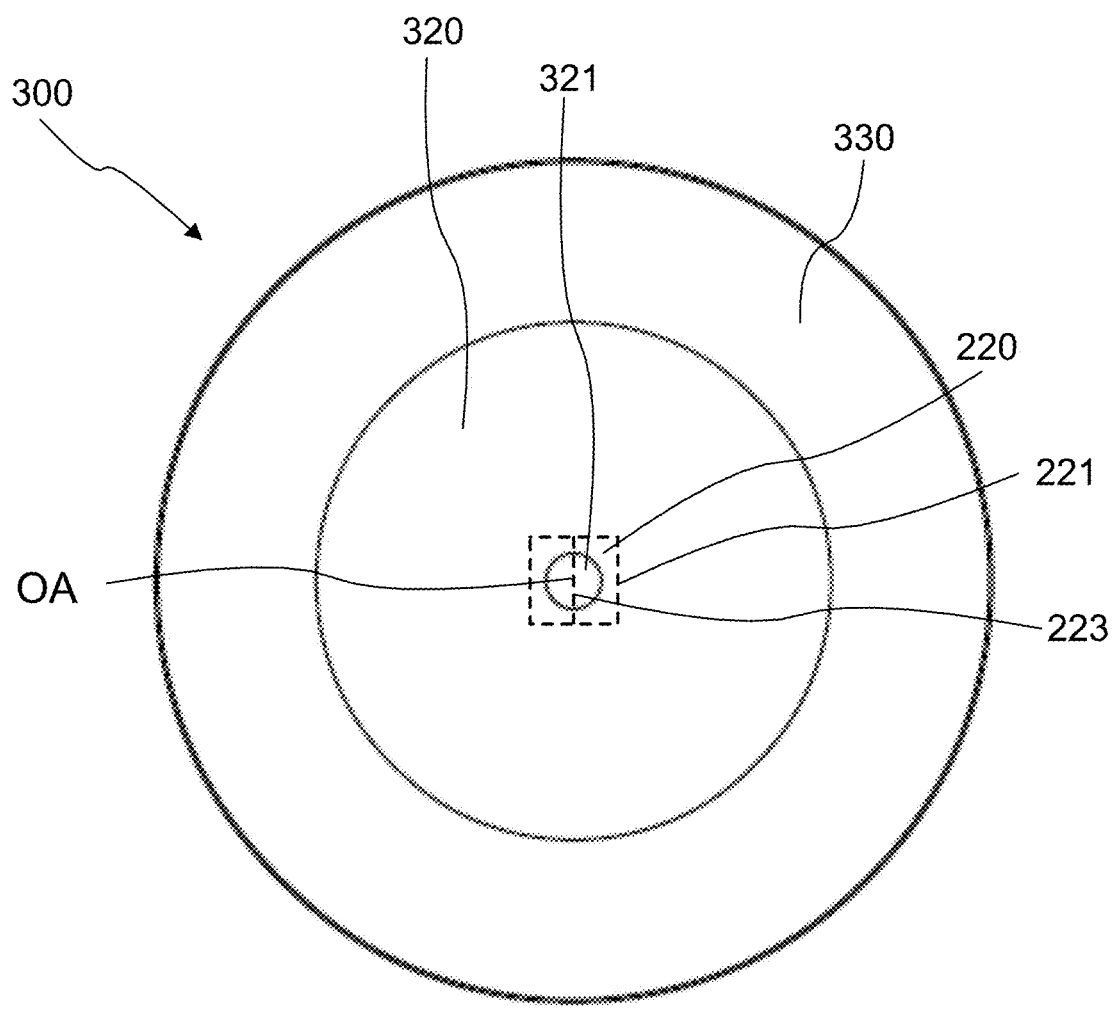
FIGS. 4A and 4B are enlarged views of the light flux controlling member according to the embodiment.

FIG. 4A is an enlarged view of FIG. 3B. FIG. 4A illustrates light emitting element 220 disposed below light flux controlling member 300. With reference to FIG. 4A, the inner edge that is the end of first reflecting surface 320 on the center side is described with regard to the positional relationship with light emitting element 220. Normally, light emitting element 220 disposed below light flux controlling member 300 is not visible, but FIG. 4A illustrates it with the broken line for the purpose of description.

As illustrated in FIG. 4A, in plan view of first reflecting surface 320, inner edge 321 formed by the end of first reflecting surface 320 on the central axis CA side of light emitting element 220 is a circle. In the see-through plan view, this inner edge 321 is located inside outer edge 221 of light emitting element 220. It suffices that the distance between inner edge 321 and outer edge 221 is 25% or less, more preferably 23% or less, of the length of the minor axis 223 of light emitting element 220 passing through the center of light emitting element 220.

When the inner edge of first reflecting surface 320 and the outer edge of light emitting element 220 have the above-described positional relationship, light emitted from the side surface of light emitting element 220 provided with a reflection film at the top surface is easily reflected by first reflecting surface 320, thus making the luminance distribution favorable.

Note that preferably, in the see-through plan view, the area inside inner edge 321 formed by the end of first reflecting surface 320 is 60% to 80% of the area inside outer edge 221 of light emitting element 220.

As illustrated in FIG. 3E in the present embodiment, the region inside inner edge 321 is a flat surface, and is parallel to the rear side of light flux controlling member 300. Note that this region may not be a flat surface.

Second Reflecting Surface

Second reflecting surface 330 is disposed outside first reflecting surface 320 on the front side of light flux controlling member 300. Mainly, second reflecting surface 330 reflects toward substrate 210 the light having reached second reflecting surface 330. The second reflecting surface is a flat surface that is substantially perpendicular to central axis CA of light emitting element 220. In plan view of light flux controlling member 300, second reflecting surface 330 is disposed in a ring shape.

Emission Surface

Emission surface 340 is a surface disposed at the side surface of light flux controlling member 300, and emits to the outside of light flux controlling member 300 another part of light emitted from light emitting element 220 and light reflected by first reflecting surface 320. Emission surface 340 is approximately parallel to central axis CA of light emitting element 220.

Figure 4B:

FIG. 4B is a partially enlarged view of FIG. 3D, and illustrates details of emission surface 340. As illustrated in FIG. 4B, in the present embodiment, emission surface 340 includes first emission surface 341, second emission surface 342, and third emission surface 343 in the order from the rear side to the front side.

First emission surface 341 and third emission surface 343 are perpendicular to central axis CA of light emitting element 220. Second emission surface 342 is slightly tilted to approach the rear side of light flux controlling member 300 as the distance from central axis CA of light emitting element 220 increases. Note that second emission surface 342 and third emission surface 343 may be roughened.

Light Distribution Simulation

Figure 5A:
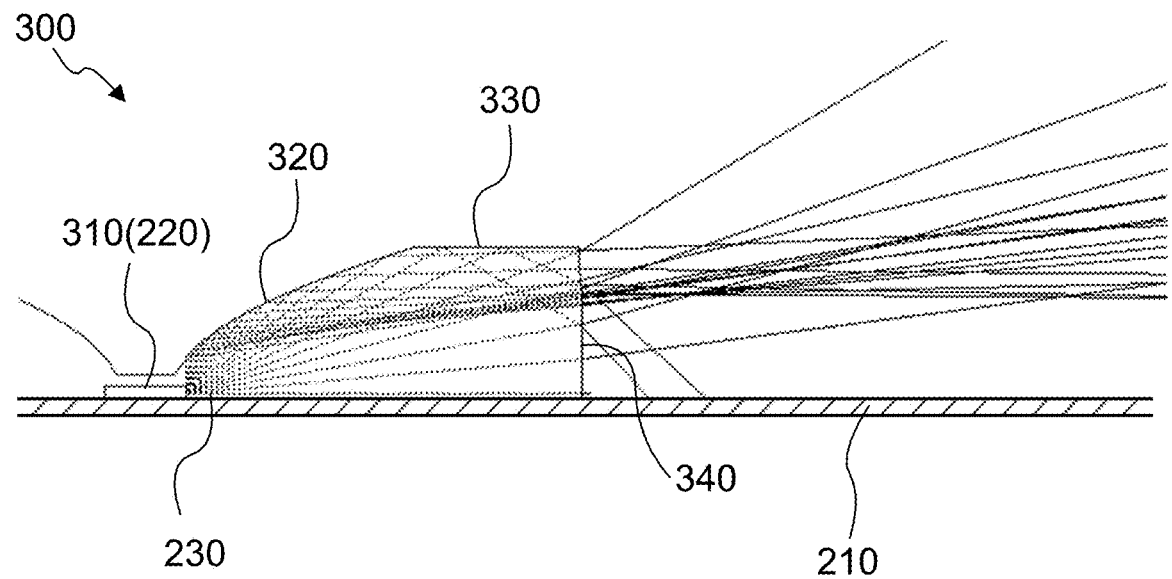
FIGS. 5A and 5B are diagrams illustrating a distribution of light beams in a light flux controlling member according to Embodiment 1.
Figure 5B:
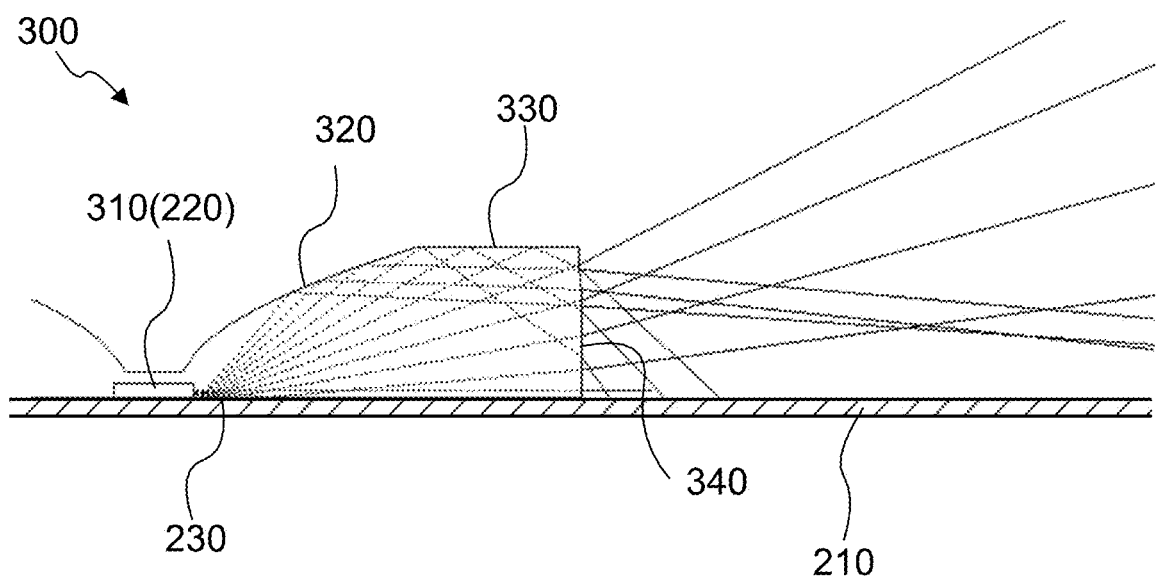

FIGS. 5A and 5B illustrates results of light distribution simulations with light emitting device 200 according to the present embodiment. FIGS. 5A and 5B use light emitting element (light emitting diode) 220 provided with a reflection film at the top surface with a height of 0.08 mm, and illustrate in cross section a distribution of light beams emitted from an emission point, which is set to a half point of the height of the light emitting element, i.e., a height of 0.04 mm. Note that light emitting element 220 is sealed with light transmissive resin 230 provided in recess 310 of light flux controlling member 300. The refractive index of light flux controlling member 300 is 1.41, and the refractive index of light transmissive resin 230 is 1.41.

With respect to 0° set to the direction that is perpendicular to substrate 210 and is toward the front side of light flux controlling member 300 from the emission point, FIG. 5A illustrates a distribution of light beams emitted at angles of 0° to 90° from the emission point, and FIG. 5B illustrates a distribution of light beams emitted at angles of 91° to 180° from the emission point.

With reference to FIG. 5A, mainly, the light beams at 0° to 90° are reflected at first reflecting surface 320 or second reflecting surface 330 to be emitted from emission surface 340, or are directly emitted from emission surface 340 without being reflected at first reflecting surface 320. On the other hand, mainly, the light beams at 91° to 180° are reflected at substrate 210 and then reflected at first reflecting surface 320 or second reflecting surface 330 so as to be emitted from emission surface 340, or directly emitted from emission surface 340 after being reflected at substrate 210. Note that in the light emitting device of the present embodiment, light transmissive resin 230 with a small refractive index difference from light flux controlling member 300 is provided between the rear surface of light flux controlling member 300 and substrate 210, and as such the light beams are transmitted through the rear surface and reflected at substrate 210 without being reflected at the rear surface.

FIGS. 6A to 6D illustrate simulation results of a distribution of light beams in the case where the angle of light beams is more finely defined.

Figure 6A:
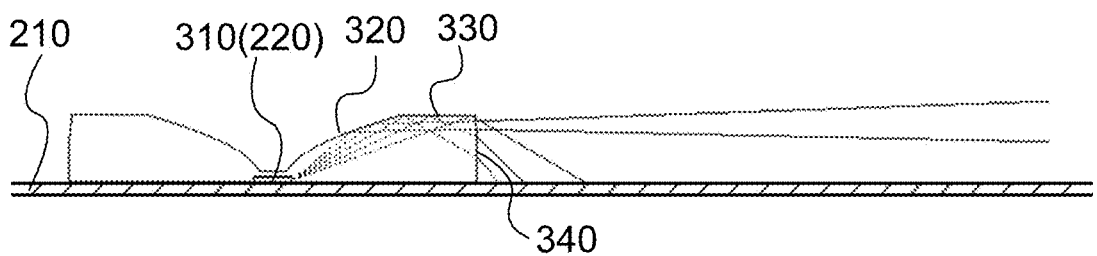
FIGS. 6A to 6D are diagrams illustrating a distribution of light beams in the light flux controlling member according to Embodiment 1.
Figure 6B:
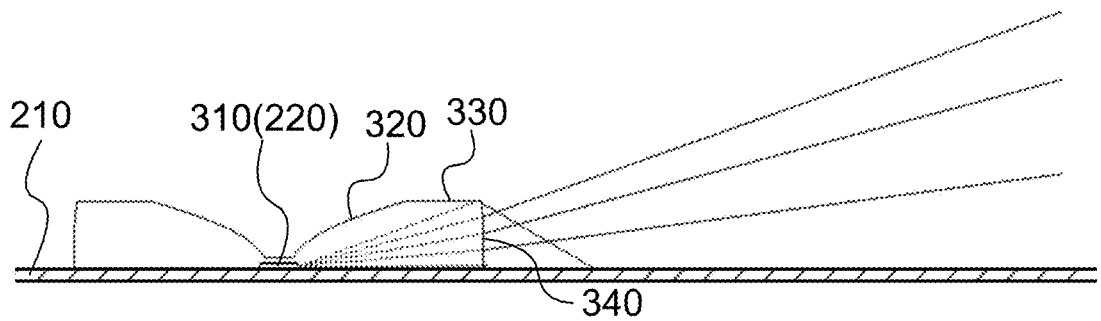
Figure 6C:
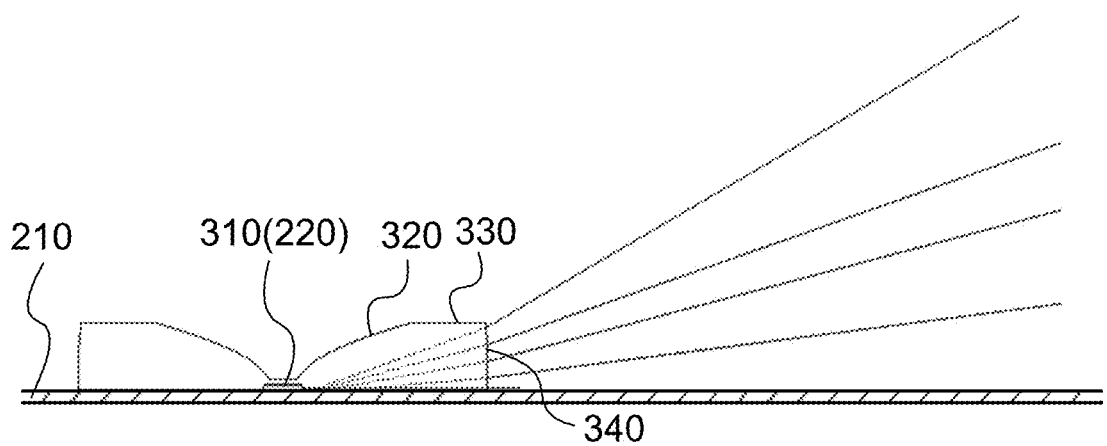
Figure 6D:
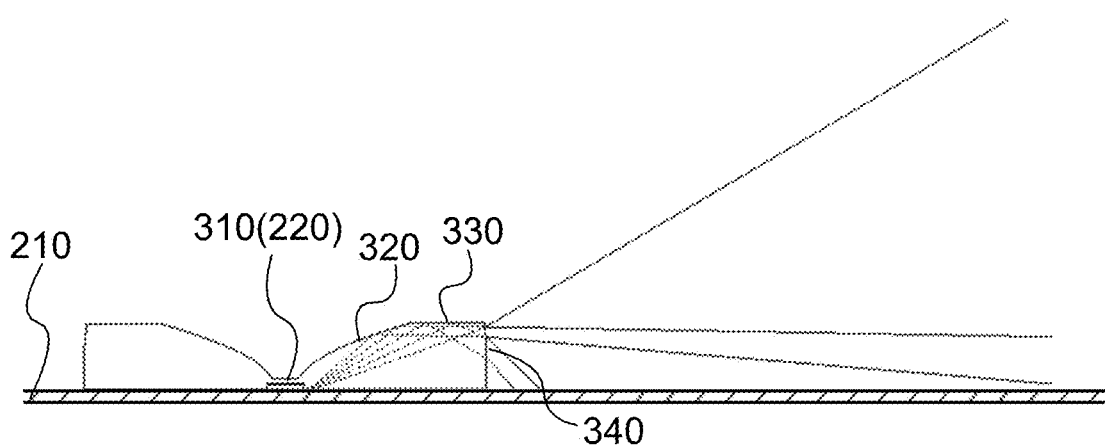

FIG. 6A illustrates a distribution of light beams emitted at angles of 50° to 70° from the emission point, FIG. 6B illustrates a distribution of light beams emitted at angles of 70° to 90° from the emission point, FIG. 6C illustrates a distribution of light beams emitted at angles of 90° to 110° from the emission point, and FIG. 6D illustrates a distribution of light beams emitted at angles of 110° to 130° from the emission point.

As is clear from FIG. 6A, mainly, the light beams at 50° to 70° are reflected at first reflecting surface 320 or second reflecting surface 330 and emitted from emission surface 340. As is clear from FIG. 6B, mainly, the light beams at 0° to 90° are directly emitted from emission surface 340 without being reflected at first reflecting surface 320. As is clear from FIG. 6C, mainly, the light beams at 90° to 110° are reflected at substrate 210, and then directly emitted from emission surface 340. As is clear from FIG. 6D, mainly, the light beams at 110° to 130° are reflected at substrate 210, and then reflected at first reflecting surface 320 or second reflecting surface 330 so as to be emitted from emission surface 340.

Figure 7:
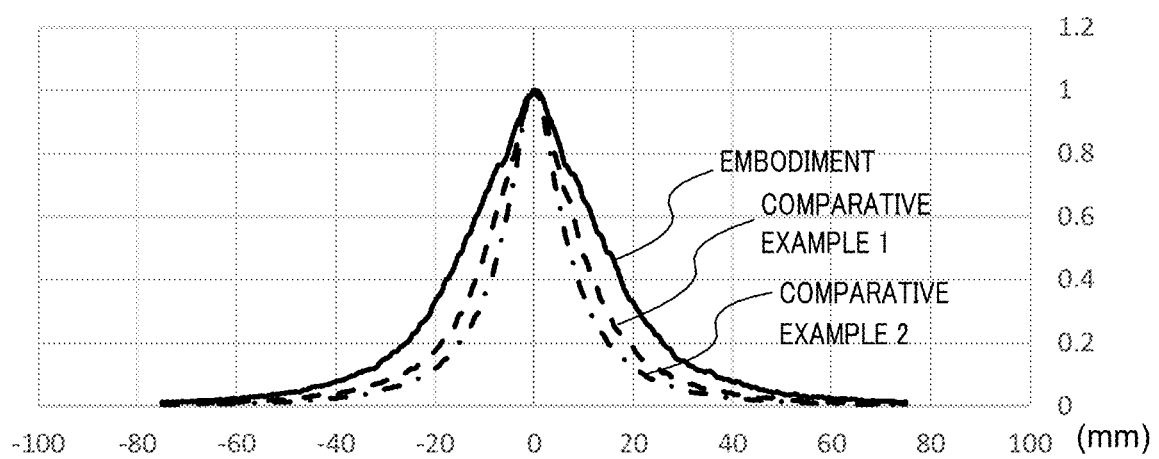
FIG. 7 is a diagram illustrating a luminance distribution of a light emitting device according to Embodiment 1.

FIG. 7 illustrates a luminance distribution of the light emitting device according to the embodiment, and a luminance distribution of light emitting devices of Comparative Examples 1 and 2. FIG. 7 illustrates luminance distributions of light that reaches the light diffusion plate. In FIG. 7, the abscissa is set such that the intersection of the central axis of the light emitting element and the light diffusion plate is 0 mm. In addition, in FIG. 7, the ordinate indicates a normalized luminance. Here, the maximum value of the luminance of each light emitting device is set to 1 for the purpose of comparison of the light spreading performances of the light emitting devices.

The light emitting device according to the embodiment includes light flux controlling member 300 as described above, and has the light distribution characteristics illustrated in FIGS. 5 and 6. On the other hand, a light emitting device according to Comparative Example 1 is a device obtained through potting of a light emitting element provided with a reflection film at the top surface, and a light emitting device according to Comparative Example 2 is a device obtained through potting of a light emitting element with no reflection film at the top surface.

As is clear from FIG. 7, the light emitting device according to the embodiment spreads more light than in Comparative Examples 1 and 2.

On the basis of FIGS. 6A to 6D and FIG. 7, from a view point of spreading the light, a preferable distribution of light beams of the light flux controlling member of the light emitting device is as follows.

Specifically, the direction of emission from the emission point set to the position of half the height of light emitting element 220, which is perpendicular to substrate 210 and is toward the front side of light flux controlling member 300 is set to 0°, and the light beam emitted at an angle of 70° to 110° is referred to as first angle light beam. In this case, the first angle light beam preferably includes a light beam that is emitted from light emitting element 220 and then emitted from emission surface 340 without being reflected at first reflecting surface 320 and second reflecting surface 330 (see FIGS. 6B and 6C).

The amount of the light beam that is emitted from light emitting element 220 and then emitted from emission surface 340 without being reflected at first reflecting surface 320 and second reflecting surface 330 in the first angle light beams may be adjusted as necessary in accordance with the desired light distribution characteristics. For example, it suffices that 80% or more, 85% or more, 90% or more, or 95% or more of the first angle light beam is emitted from emission surface 340 without being reflected at first reflecting surface 320 and second reflecting surface 330. It suffices that the upper limit of the numerical value is 100% or less, 95% or less, or 90% or less, for example.

In addition, likewise, the direction of emission from the emission point set to the position of half the height of light emitting element 220, which is perpendicular to substrate 210 and is toward the front side of light flux controlling member 300 is set to 0°, and the light beam emitted at an angle equal to or greater than 60° and smaller than 70° is referred to as second angle light beam, and, the light beam emitted at an angle greater than 110° and equal to or smaller than 120° is referred to as third angle light beam. At this time, it is considered that preferably, the second angle light beam and the third angle light beam include a light beam that is emitted from light emitting element 220 and then reflected at second reflecting surface 330 and emitted from emission surface 340 toward substrate 210 (see FIGS. 6A and 6D).

The amount of the light beam that is emitted from light emitting element 220 and then reflected at second reflecting surface 330 and emitted from emission surface 340 toward substrate 210 in the second angle light beams may be adjusted as necessary in accordance with the desired light distribution characteristics. For example, it suffices that 80% or more, 85% or more, 90% or more, or 95% or more of the second angle light beam is reflected at second reflecting surface 330 and emitted from emission surface 340 toward substrate 210 after the emission from light emitting element 220. It suffices that the upper limit of the numerical value is 100% or less, 95% or less, or 90% or less, for example.

The amount of the light beam that is emitted from light emitting element 220 and then reflected at second reflecting surface 330 and emitted from emission surface 340 toward substrate 210 in the third angle light beams may be adjusted as necessary in accordance with the desired light distribution characteristics. For example, it suffices that 80% or more, 85% or more, 90% or more, or 95% or more of the third angle light beam is reflected at second reflecting surface 330 and emitted from emission surface 340 toward substrate 210 after the emission from light emitting element 220. It suffices that the upper limit of the numerical value is 100% or less, 95% or less, or 90% or less, for example.

Effects

With the light flux controlling member according to the embodiment of the present invention, the recess of the light flux controlling member covers the light emitting element, and the light transmissive resin provided in the recess seals the light emitting element. In this manner, the light can be further spread with the light flux controlling member while sealing the light emitting element.

Modification 1

A light emitting device according to Modification 1 is described below.

Figure 8:
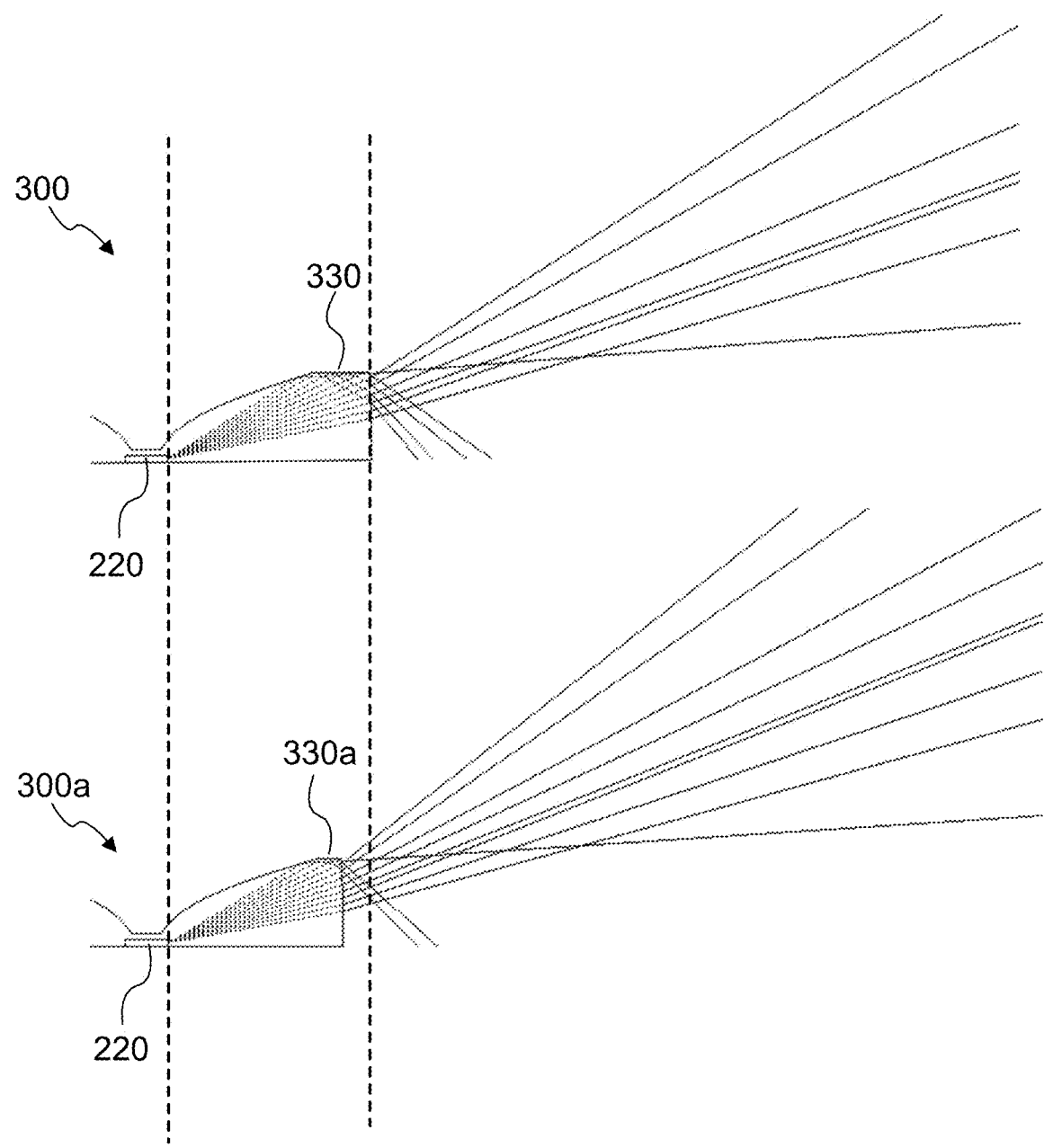
FIG. 8 is a diagram illustrating a distribution of light beams in the light flux controlling members according to Embodiment 1 and Modification 1.
Figure 9:
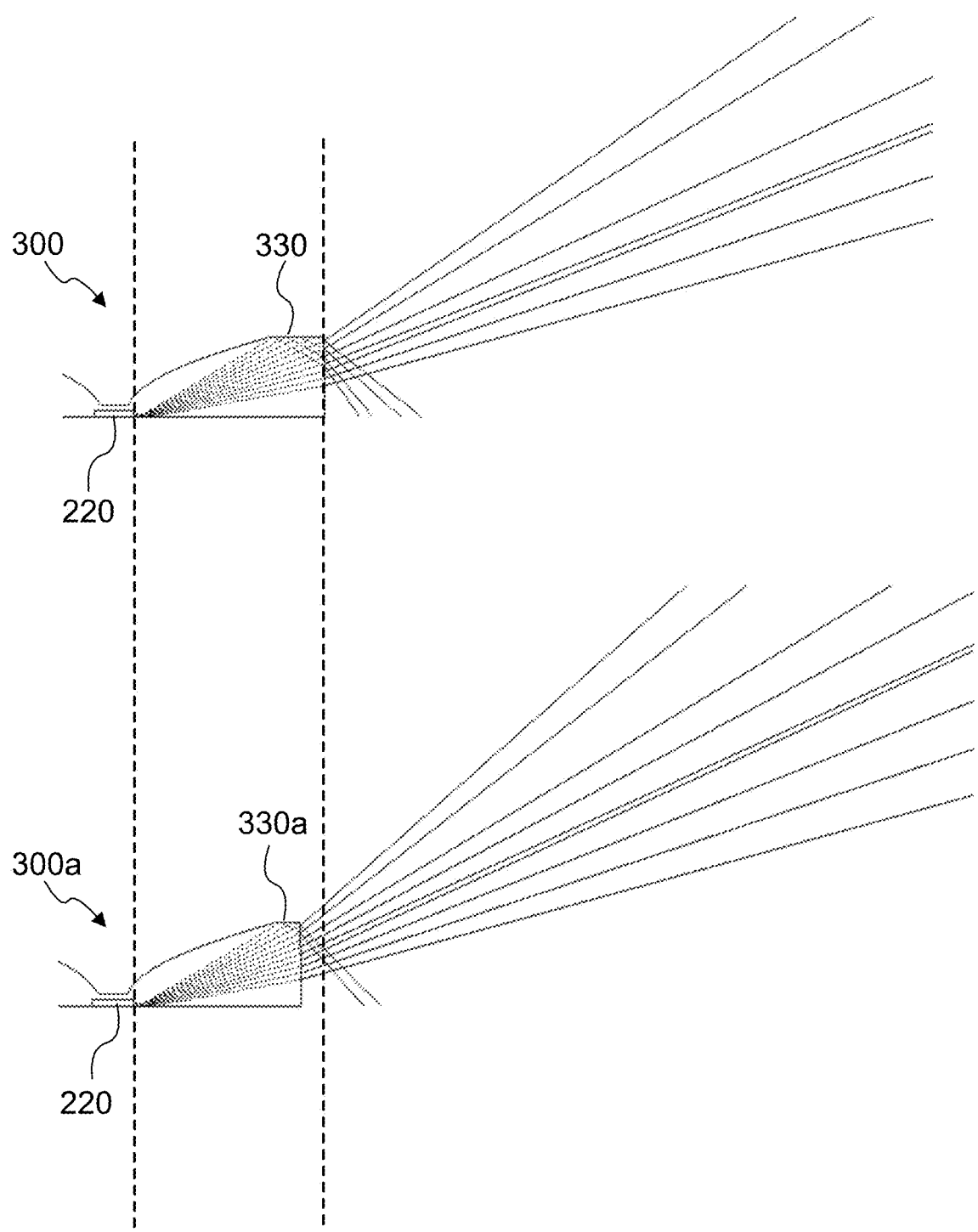
FIG. 9 is a diagram illustrating a distribution of light beams in the light flux controlling members according to Embodiment 1 and Modification 1.

FIGS. 8 and 9 illustrate comparisons between a light distribution obtained with light flux controlling member 300 provided in light emitting device 200 according to the embodiment and a light distribution obtained with light flux controlling member 300a provided with the light emitting device according to Modification 1.

In FIGS. 8 and 9, as indicated with the left broken line, the positions of light emitting elements 220 of the embodiment and Modification 1 are aligned with each other. Further, as indicated with the right broken line, second reflecting surface 330a of light flux controlling member 300a according to the modification is smaller by 0.4 mm in the radial direction than second reflecting surface 330 of light flux controlling member 300 according to the embodiment. FIGS. 8 and 9 compare the light distribution of the light emitting device of Modification 1 with the light distribution of the light emitting device according to the embodiment. More specifically, the upper diagram in FIG. 8 illustrates a distribution of light beams of 60° to 80° in the light emitting device according to the embodiment, and the lower diagram illustrates a distribution of light beams of 60° to 80° in the light emitting device according to Modification 1. Likewise, the upper diagram in FIG. 9 illustrates a distribution of light beams of 100° to 120° in the light emitting device according to the embodiment, and the lower diagram illustrates a distribution of light beams of 100° to 120° in light emitting device according to Modification 1.

As is clear from FIGS. 8 and 9, in light flux controlling member 300a provided with the light emitting device according to Modification 1, the amount of light that is reflected at second reflecting surface 330a toward the substrate side is small since second reflecting surface 330a is short.

Figure 10:
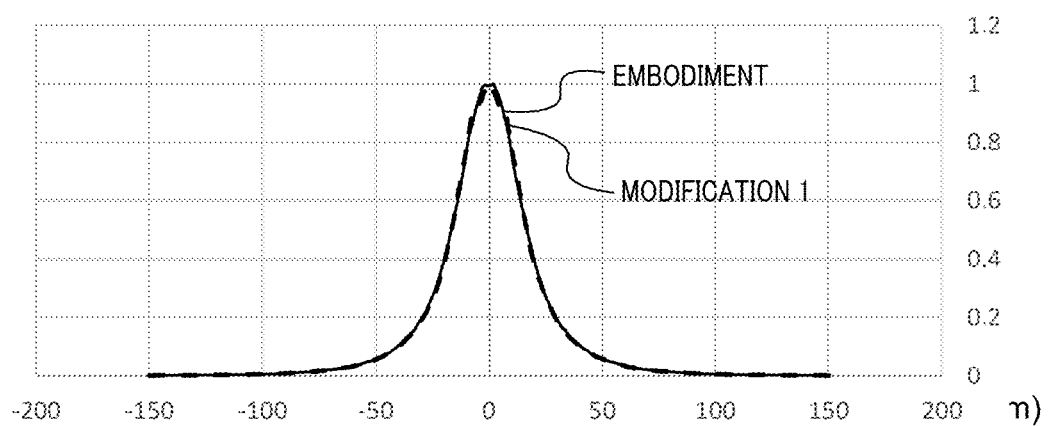
FIG. 10 is a diagram illustrating a luminance distribution of the light emitting devices according to Embodiment 1 and Modification 1.

FIG. 10 illustrates luminance distributions of the light emitting device according to the embodiment and the light emitting device according to Modification 1. In FIG. 10, the maximum value of the luminance is set to 1 such that their spread of light can be easily compared as in FIG. 7. As is clear from FIG. 10, the light emitting device according to the embodiment and the light emitting device according to the modification have substantially the same luminance distribution, but the light emitting device according to the modification generated a high luminance area at a position around 8 mm in comparison with the light emitting device according to the embodiment. This corresponds to the fact that in the light emitting device according to the modification, light emitted at a specific angle reaches the light diffusion plate without being reflected at second reflecting surface 330a as illustrated in FIGS. 8 and 9.

Effects

The light emitting device according to Modification 1 has an effect similar to that of the light emitting device according to the embodiment.

Modification 2

A light emitting device according to Modification 2 is described below.

Figure 11:
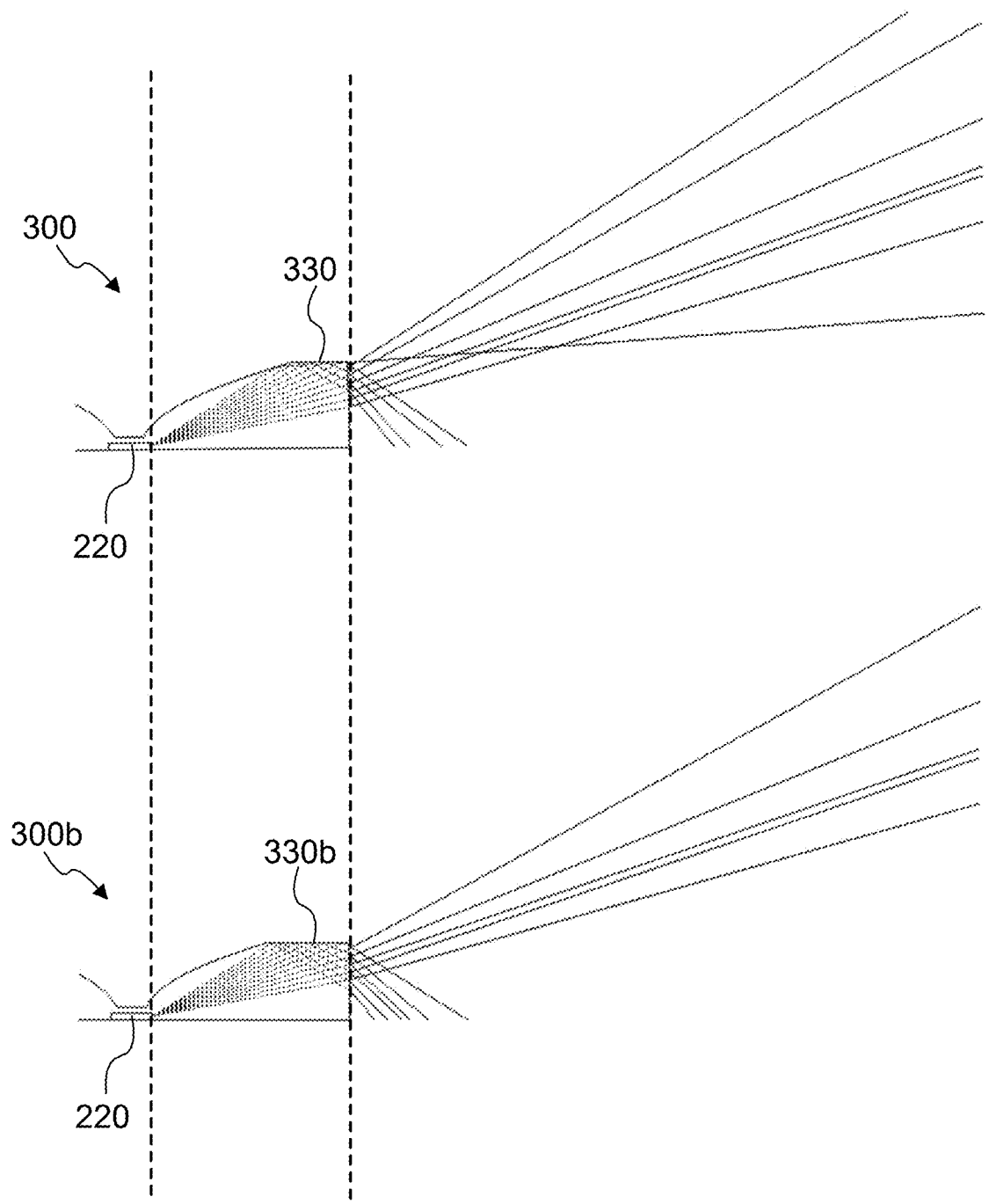
FIG. 11 is a diagram illustrating a distribution of light beams in the light flux controlling members according to Embodiment 1 and Modification 2.
Figure 12:
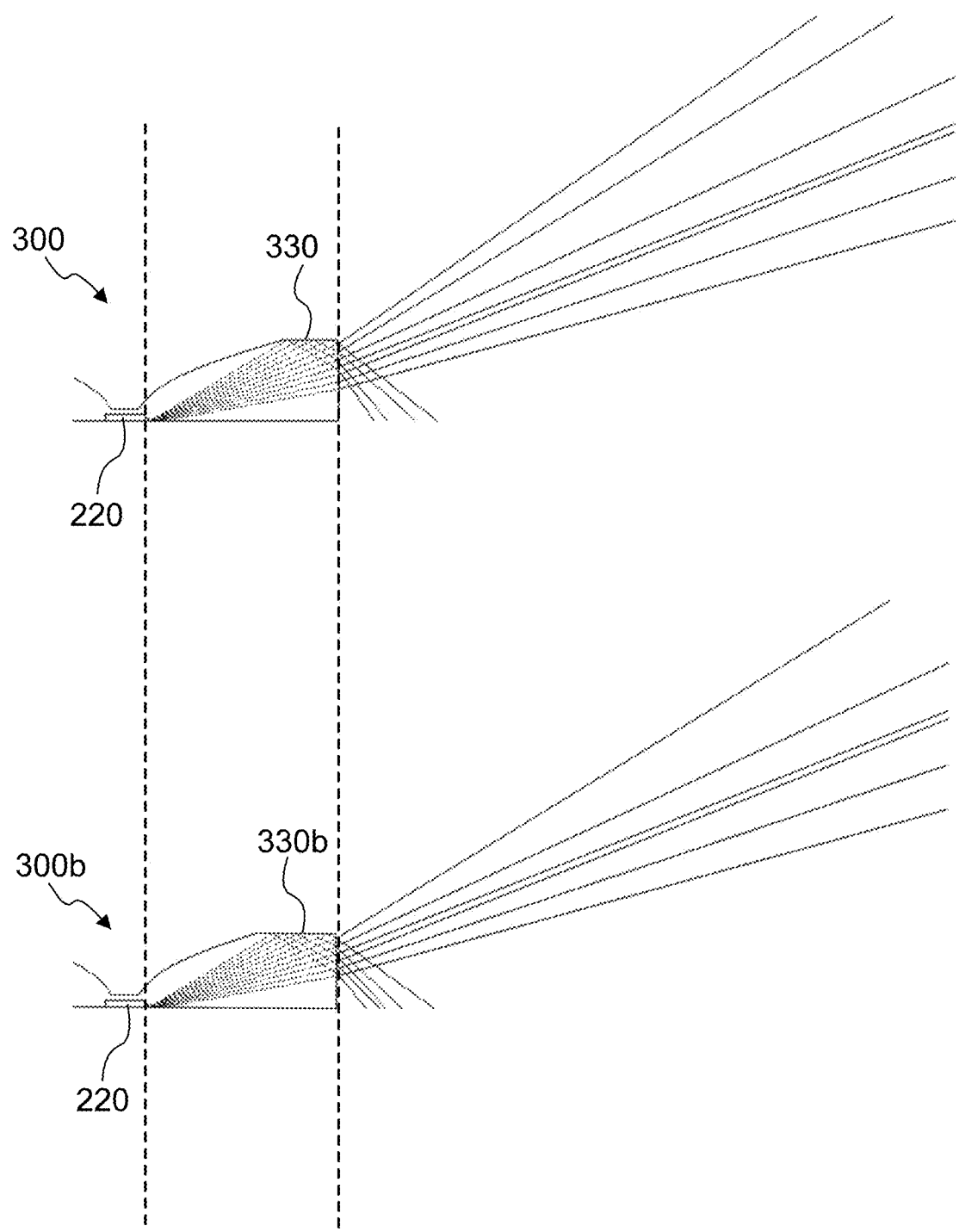
FIG. 12 is a diagram illustrating a distribution of light beams in the light flux controlling members according to Embodiment 1 and Modification 2.

FIGS. 11 and 12 illustrate comparisons between a light distribution obtained with light flux controlling member 300 provided with light emitting device 200 according to the embodiment and a light distribution obtained with light flux controlling member 300b provided with the light emitting device according to Modification 2.

In FIGS. 11 and 12, as indicated with the left broken line, the positions of light emitting elements 220 of the embodiment and Modification 2 are aligned with each other. In addition, as indicated with the right broken line, the positions of the outer edges of second reflecting surfaces 330 are also aligned. On the other hand, in light flux controlling member 300b of Modification 2, the height of light flux controlling member (second reflecting surface 330b) is lower than light flux controlling member 300 of the embodiment. FIGS. 11 and 12 compare the light distribution of the light emitting device according to Modification 2 with the light distribution of the embodiment. More specifically, the upper diagram in FIG. 11 illustrates a distribution of light beams of 60° to 80° in the light emitting device according to the embodiment, and the lower diagram illustrates a distribution of light beams of 60° to 80° in the light emitting device according to Modification 2. Likewise, the upper diagram in FIG. 12 illustrates a distribution of light beams of 100° to 120° in the light emitting device according to the embodiment, and the lower diagram illustrates a distribution of light beams of 100° to 120° in the light emitting device according to Modification 2.

As is clear from FIGS. 11 and 12, in light flux controlling member 300b provided in the light emitting device according to Modification 2, second reflecting surface 330b is located at a lower position, and as such the amount of the light that reaches second reflecting surface 330b so as to be reflected toward the substrate side is larger in comparison with the embodiment. The light going toward the substrate is reflected to impinge on the light diffusion plate in the vicinity of light emitting element 220.

Figure 13:
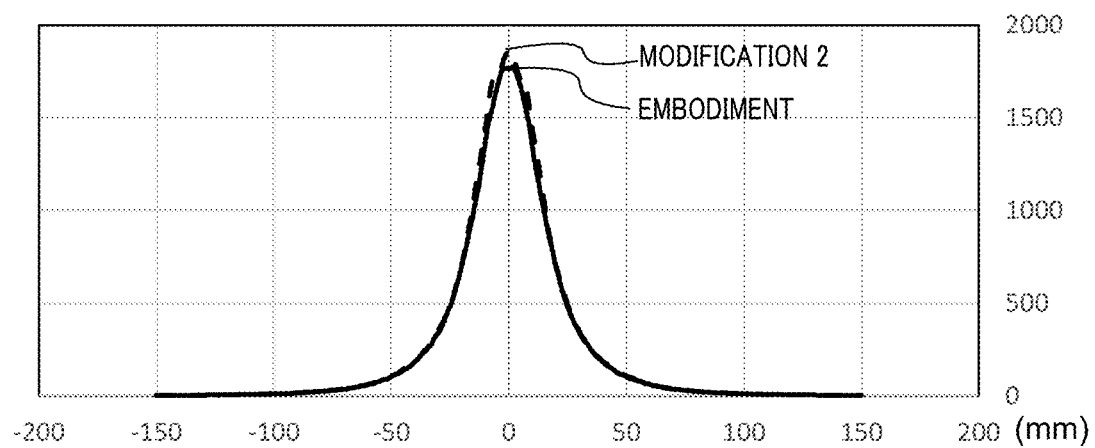
FIG. 13 is a diagram illustrating a luminance distribution of the light emitting devices of according to Embodiment 1 and Modification 2.

FIG. 13 includes luminance distributions of the light emitting device according to the embodiment and the light emitting device according to Modification 2. As is clear from FIG. 13, comparing the light emitting device according to the embodiment and the light emitting device according to Modification 2, the luminance at a position near a position immediately above the light emitting element is higher in the light emitting device according to Modification 2. This corresponds to the fact that in Modification 2 the light reflected at second reflecting surface 330b toward the substrate is reflected at the substrate to impinge on the light diffusion plate in the vicinity of light emitting element 220 as illustrated in FIGS. 11 and 12.

Effects

The light emitting device according to Modification 2 has an effect similar to that of the light emitting device according to the embodiment.

Modifications 3 and 4

Light emitting devices according to Modifications 3 and 4 are described below.

Figure 14A:
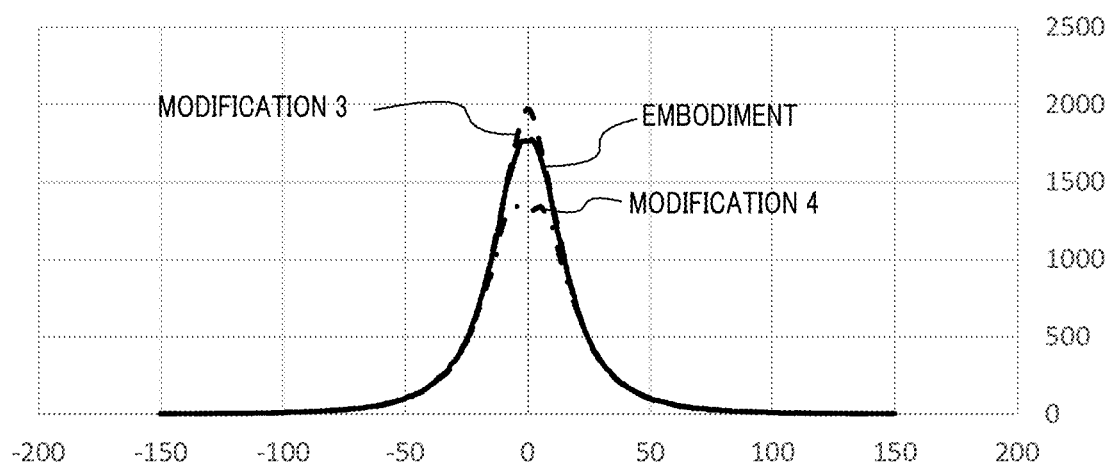
FIGS. 14A and 14B are diagrams illustrating a luminance distribution of the light emitting devices according to Embodiment 1, Modification 3 and Modification 4.
Figure 14B:
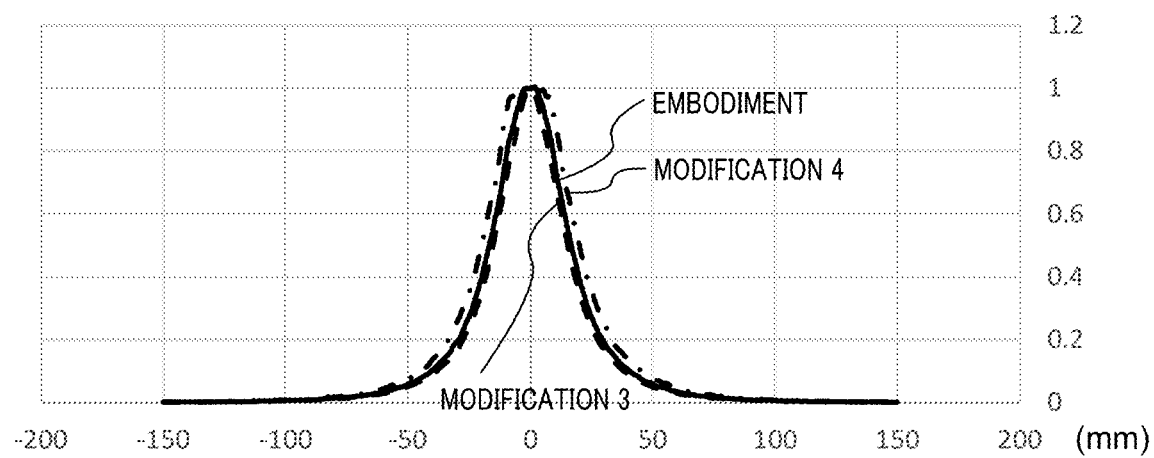

FIGS. 14A and 14B illustrate luminance distributions of the light emitting devices according to the embodiment and Modifications 3 and 4.

The light flux controlling member provided in the light emitting device of Modification 3 is a size reduction version of light flux controlling member 300 provided in the light emitting device of the embodiment. For the size reduction, the length, height and the like of light flux controlling member 300 in the radial direction and the like are reduced in the same ratio. As such, the shapes of light flux controlling member 300 and the light flux controlling member provided of Modification 3 are similar to each other. The size is reduced such that the size is 90% of the size of light flux controlling member 300, which is set to 100%.

On the other hand, the light flux controlling member provided in the light emitting device of Modification 4 is increased to 116% of the size of light flux controlling member 300, which is set to 100%. Note that the size is increased such that the shapes of light flux controlling member 300 and the light flux controlling member of Modification 4 are similar to each other.

FIG. 14A illustrates luminance distributions of the embodiment, Modification 3, and the Comparative Example, and FIG. 14B is an illustration with the maximum value of the luminance illustrated in FIG. 14A set to 1. As illustrated in FIG. 14B, in Modification 4, light was spread laterally, which is not preferable.

Effects

The light emitting devices according to Modifications 3 and 4 have an effect similar to that of the light emitting device according to the embodiment.

Refractive Index

Figure 15A:
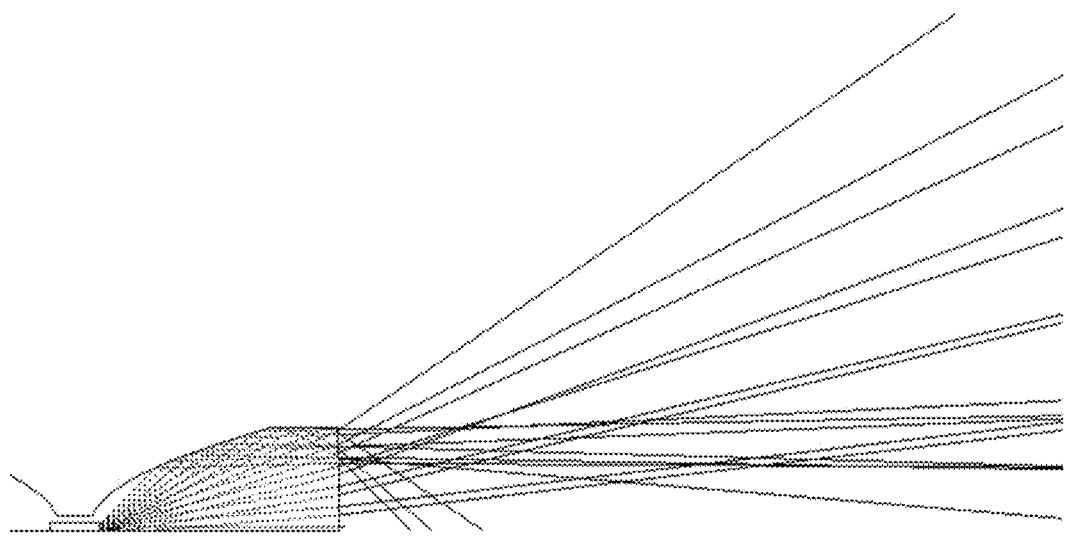
FIGS. 15A and 15B are diagrams illustrating a distribution of light beams in the light flux controlling member according to Embodiment 1.
Figure 15B:
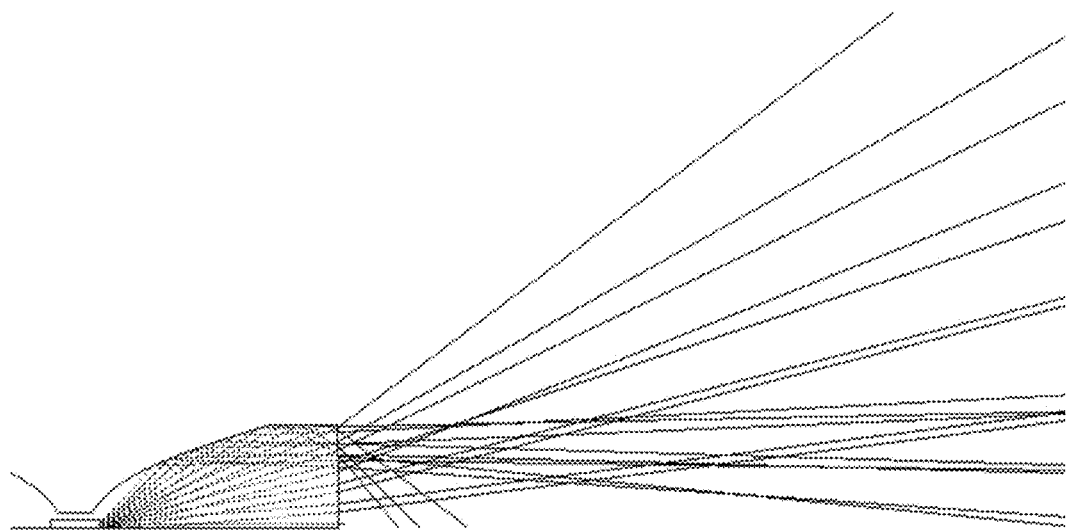

FIGS. 15A and 15B illustrate light distributions of the case where the refractive index of the material of light flux controlling member 300 of the light emitting device according to the embodiment is set to 1.41 and 1.51. As illustrated in FIGS. 15A and 15B, the distribution of light beams does not change much even when the refractive index of the material of light flux controlling member 300 is changed. The reason for this is that light emitting element 220 is sealed by light transmissive resin 230 provided in the recess of light flux controlling member 300, and therefore light emitted from light emitting element 220 does not travel through the air during the travel from the recess of the light flux controlling member to the inside of light flux controlling member 300. Thus, the refraction of the light beam is suppressed, and the distribution of light beams does not change much even when the refractive index of the material of light flux controlling member 300 is changed.

Embodiment 2

FIG. 16A is a plan view of light flux controlling member 400 according to Embodiment 2, FIG. 16B is a bottom view, FIG. 16C is a sectional view taken along line C-C of FIG. 16A, and FIG. 16D is a sectional view taken along line D-D of FIG. 16A. In addition, FIGS. 16E and 16F are side views of light flux controlling member 400. Note that FIGS. 16B, 16C and 16D illustrate a state where light emitting element 220 is sealed with light transmissive resin 230 in recess 410 of light flux controlling member 400.

Light flux controlling member 400 according to Embodiment 2 is mainly different from light flux controlling member 300 according to Embodiment 1 in that the shape in plan view is an ellipse shape as illustrated in FIG. 16A. As with light flux controlling member 300, light flux controlling member 400 includes recess 410, first reflecting surface 420, second reflecting surface 430, and emission surface 440. Each member is described below.

Recess

Recess 410 is disposed on the rear side of light flux controlling member 400 to intersect the central axis of light emitting element 220. The inner surface of recess 410 is a surface through which light from the light emitting element enters light flux controlling member 400. Recess 410 is filled with light transmissive resin 230 to seal light emitting element 220. In the present embodiment, the shape of recess 410 is a hemispherical shape, and is a circular shape in bottom view of light flux controlling member 400.

It suffices that recess 410 formed in light flux controlling member 400 is a recess that can accommodate light emitting element 220, and that light flux controlling member 400 and light emitting element 220 are bonded through light transmissive resin 230 in recess 410, and the shape of recess 410 is not limited to the shape in the illustration.

First Reflecting Surface

First reflecting surface 420, disposed on the front side of light flux controlling member 400, reflects at least a part of the light entered from recess 410, in the direction that is substantially perpendicular to the central axis of light emitting element 220 and is away from the central axis. As illustrated in FIG. 16A, in plan view of light flux controlling member 400, first reflecting surface 420 surrounds the center of light flux controlling member 300, with the inner edge and outer edge having elliptical shapes that are disposed in a ring shape. In addition, as is clear from the sectional views of FIGS. 16C and 16D, first reflecting surface 420 is a curved surface that is formed such that the tangent to the curved surface gradually comes closer to the rear surface of light flux controlling member 400 parallel from the center of light flux controlling member 400 toward the outside. With first reflecting surface 420 having such a shape, the light having been transmitted through the recess and reached first reflecting surface 420 is reflected in the direction away from the central axis of light emitting element 220.

Second Reflecting Surface

Second reflecting surface 430 is disposed on the front side of light flux controlling member 400 and the outside of first reflecting surface 420. Second reflecting surface 430 is a flat surface that is substantially perpendicular to the central axis of light emitting element 220. In plan view of light flux controlling member 400, second reflecting surface 430 surrounds first reflecting surface 420, with the inner edge and the outer edge having elliptical shapes that are disposed in a ring shape.

Emission Surface

Emission surface 440 is a surface disposed at the side surface of light flux controlling member 400, and emits to the outside of light flux controlling member 300 another part of the light emitted from light emitting element 220 and the light reflected at first reflecting surface 420. Emission surface 440 is approximately parallel to the central axis of light emitting element 220.

Effects

According to Embodiment 2, it is possible to provide the light emitting device that can further spread the light while sealing the light source.

Manufacturing Method

Figure 17:
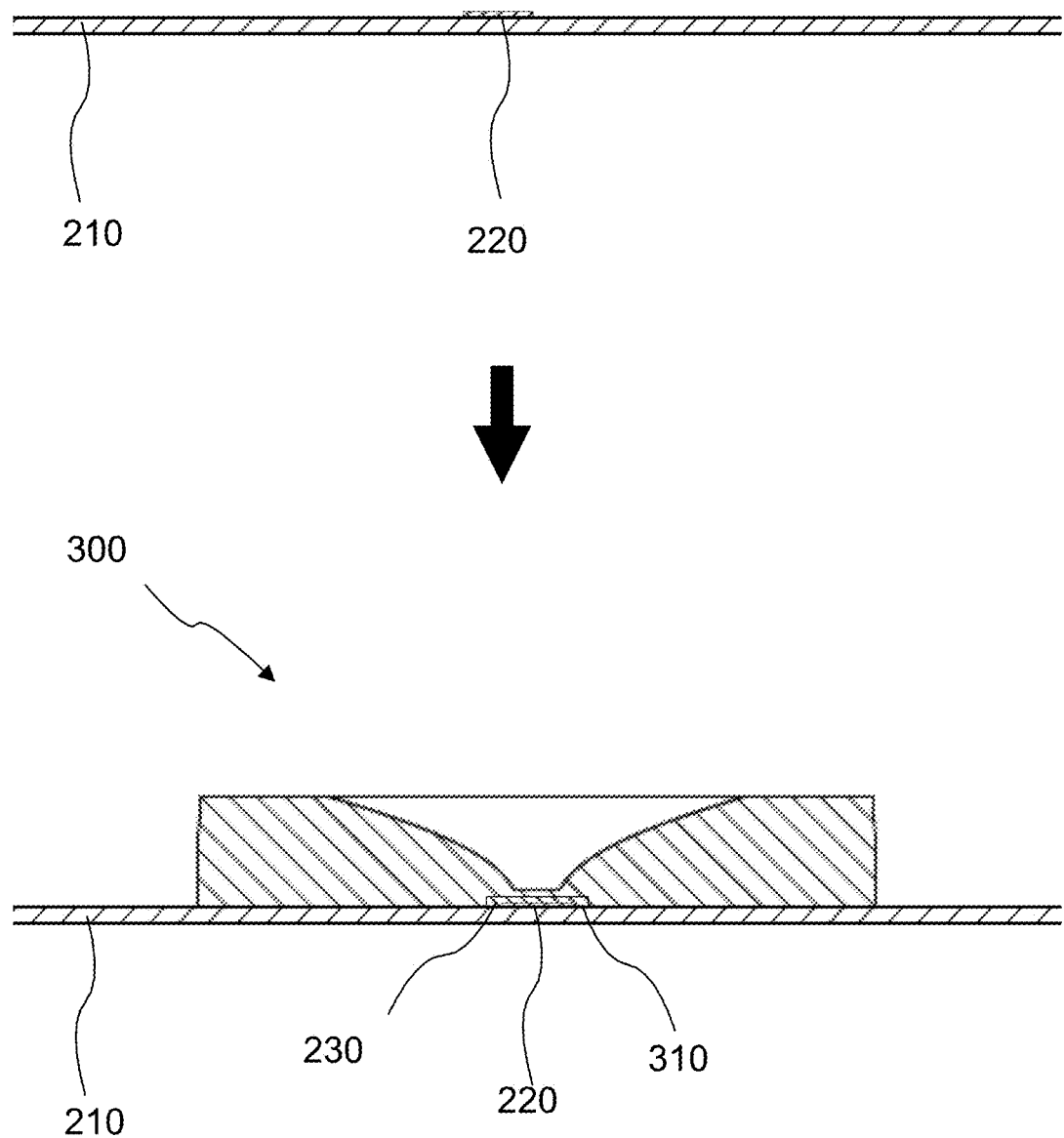
FIG. 17 is a diagram illustrating a manufacturing method for the light emitting device.

A manufacturing method for the light emitting device is described with an example case using light flux controlling member 300. As illustrated in the upper drawing in FIG. 17, the manufacturing method for the light emitting device includes a step of preparing substrate 210 where light emitting element 220 is disposed, and a step of bonding the light flux controlling member to substrate 210 while sealing light emitting element 220 by filling recess 310 of light flux controlling member 300 with light transmissive resin 230.

Figure 18:
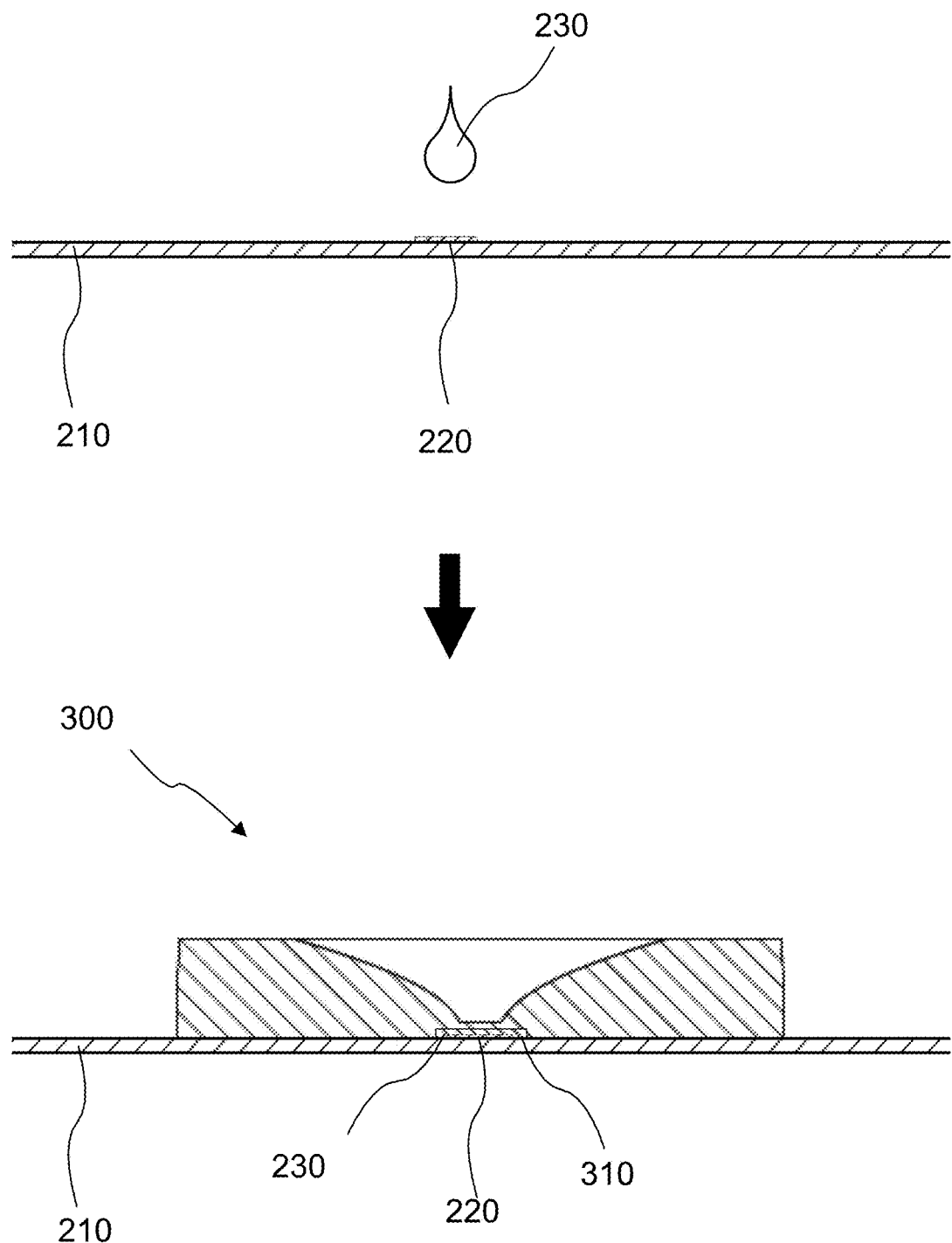
FIG. 18 is a diagram illustrating a manufacturing method for the light emitting device.

In addition, as illustrated in FIG. 18, another manufacturing method may include a step of dropping light transmissive resin 230 onto light emitting element 220 mounted on substrate 210, a step of disposing light flux controlling member 300 to substrate 210 by aligning recess 310 of light flux controlling member 300 on light transmissive resin 230, and a step of mounting light flux controlling member 300 to substrate 210 by curing light transmissive resin 230 with heat, for example.

These manufacturing methods may be applied to other embodiments, and it is preferable to prevent remaining bubbles that affect the light flux controlling function by adjusting and modifying the amount of the light transmissive resin used, the shape of the recess and the like as necessary in order to prevent bubbles from remaining inside the recess of the light flux controlling member.

INDUSTRIAL APPLICABILITY

The light emitting device, light flux controlling member and surface light source device of the present invention are applicable to the backlight of liquid crystal display apparatuses, generally-used illumination apparatuses and the like, for example.

REFERENCE SIGNS LIST

100 Surface light source device
100' Display device

102 Display member
110 Housing
112 Bottom plate
114 Top plate
120 Light diffusion plate
200 Light emitting device
210 Substrate
220 Light emitting element
221 Outer edge
222 Light reflection film
223 Minor axis
230 Light transmissive resin
300, 300a, 300b, 400 Light flux controlling member
310, 410 Recess
320, 420 First reflecting surface
321 Inner edge
330, 330a, 430 Second reflecting surface
340, 440 Emission surface
341 First emission surface
342 Second emission surface
343 Third emission surface

The invention claimed is:

1. A light emitting device comprising:
   a substrate;
   a light emitting element disposed on the substrate and including a light reflection film at a top surface;
   a light flux controlling member including a recess, a first reflecting surface, and an emission surface, the recess being disposed on a rear side to cover the light emitting element and configured to transmit light emitted from the light emitting element, the first reflecting surface being disposed on a front side and configured to reflect a part of light transmitted through the recess in a direction that is substantially perpendicular to a central axis of the light emitting element and is away from the central axis, the emission surface being configured to emit to an outside another part of the light emitted from the light emitting element and light reflected at the first reflecting surface; and
   a light transmissive resin provided in the recess to seal the light emitting element and bond the light flux controlling member to the substrate and the light emitting element,
   wherein in a see-through plan view, an end of the first reflecting surface on the central axis side is located inside an outer edge of the light emitting element, and a distance between the end of the first reflecting surface and the outer edge is 25% or less of a length of a minor axis of the light emitting element passing through a center of the light emitting element.

2. The light emitting device according to claim 1, wherein the distance between the end of the first reflecting surface and the outer edge is 23% or less of the length of the minor axis of the light emitting element passing through the center of the light emitting element.

3. The light emitting device according to claim 1, wherein an area inside of an inner edge formed by the end of the first reflecting surface is 60% to 80% of an area inside of an outer edge of the light emitting element.

4. The light emitting device according to claim 1, wherein the light flux controlling member further includes a second reflecting surface disposed outside of the first reflecting surface on the front side, the second reflecting surface being a flat surface that is substantially perpendicular to the central axis.

5. The light emitting device according to claim 4, wherein when a direction of a light beam emitted from an emission point set to a position of half a height of the light emitting element in a direction that is perpendicular to the substrate and is toward the front side of the light flux controlling member is set to 0°, a first angle light beam emitted at an angle of 70° to 110° includes a light beam that is emitted from the light emitting element and then emitted from the emission surface without being reflected at the first reflecting surface and the second reflecting surface.

6. The light emitting device according to claim 4, wherein when a direction of a light beam emitted from an emission point set to a position of half a height of the light emitting element in a direction that is perpendicular to the substrate and is toward the front side of the light flux controlling member is set to 0°, a second angle light beam emitted at an angle of equal to or greater than 60° and smaller than 70°, and a third angle light beam emitted at an angle greater than 110° and equal to or smaller than 120° include a light beam that is emitted from the light emitting element and then emitted toward the substrate from the emission surface by being reflected at the second reflecting surface.

7. The light emitting device according to claim 1, wherein the light flux controlling member and the light transmissive resin each have a refractive index of 1.4 to 1.6.

8. A surface light source device comprising:
   a light diffusion plate; and
   at least one light emitting device according to claim 1.

9. The surface light source device according to claim 8, wherein the at least one light emitting device is a plurality of light emitting devices,
   wherein the plurality of light emitting devices is disposed in a plurality of lines at even first intervals in an X direction and aligned in a plurality of lines at even second intervals in a Y direction perpendicular to the X direction,
   wherein H/Px is 0.2 to 0.3
   where the Px is a center-to-center distance of two light emitting devices adjacent to each other in the X direction among the plurality of light emitting devices,
   Py is a center-to-center distance of two light emitting devices adjacent to each other in the Y direction among the plurality of light emitting devices,
   the Px is equal to or smaller than the Py, and
   the H is a distance between the substrate and the light diffusion plate.

* * * * *